Dec. 4, 1923.

A. L. HALLIDAY

WALKING BEAM BEARING

Filed July 3, 1922

1,476,334

Inventor.
Alonzo Lewis Halliday
By Booth & Booth
Attorneys

Patented Dec. 4, 1923.

1,476,334

UNITED STATES PATENT OFFICE.

ALONZO LEWIS HALLIDAY, OF OIL CENTER, CALIFORNIA.

WALKING-BEAM BEARING.

Application filed July 3, 1922. Serial No. 572,364.

*To all whom it may concern:*

Be it known that I, ALONZO LEWIS HALLIDAY, a citizen of the United States, residing at Oil Center, in the county of Kern and State of California, have invented certain new and useful Improvements in Walking-Beam Bearings, of which the following is a specification.

My invention relates to the class of walking-beam bearings, with especial reference to those of oil well equipment. The object of my invention is to provide for efficient and lasting or relatively permanent lubrication without the usual waste and inconvenience of frequent refilling; also to eliminate the danger of the bearings becoming scored by running dry. By my invention, the expense due to delay and the inconvenience of preparation and the labor required in re-babbitting, which attend the operation of the bearings in common use, are all avoided.

To these ends, my invention consists in the novel walking-beam bearings which I shall now fully describe, by reference to the accompanying drawings, in which—

Figure 1:
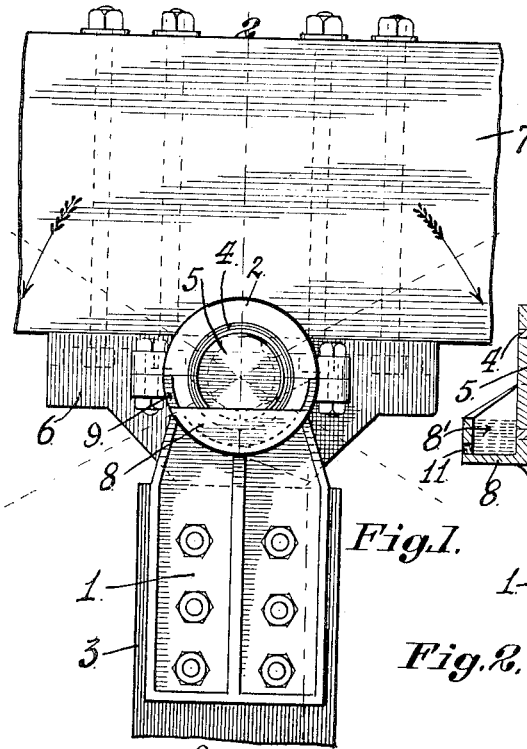
Fig. 1 is a side elevation of my walking-beam bearing.

1, 1 are two side irons, with caps 2, 2 bolted to them. These side irons are bolted to and shouldered down on opposite sides of the post 3, usually termed the Samson post. Between the caps and side irons are formed bearings fitted with Babbitt bushings 4, in which are mounted for oscillation the journals 5 of the saddle 6. Upon this saddle, the walking beam 7 is bolted as shown.

Figure 2:
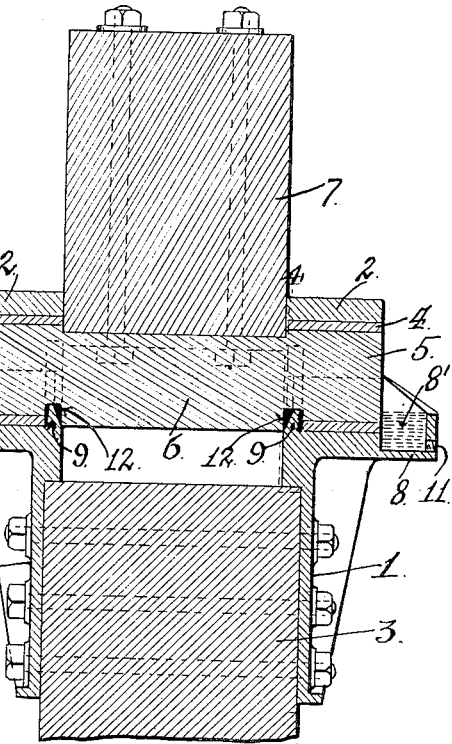
Fig. 2 is a vertical section on the line 2—2 of Fig. 1.
Figure 3:
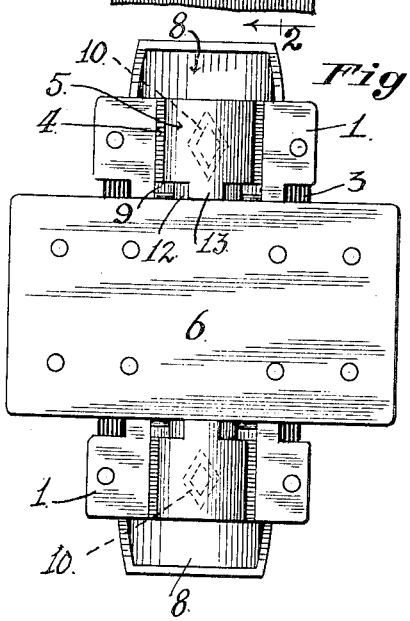
Fig. 3 is a top plan view, the walking-beam, and also the caps of the side irons being removed.
Figure 4:
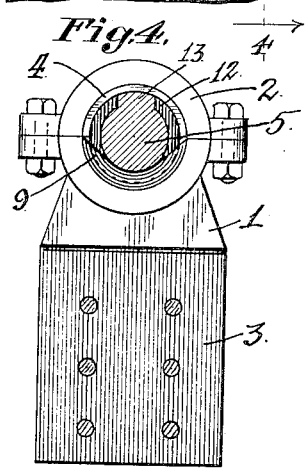
Fig. 4 is a sectional view on the line 4—4 of Fig. 2.

Each side iron 1 on its outer side, at its upper portion is formed or provided with a reservoir 8 for a body of oil indicated by 8'. The location and depth of the oil reservoirs 8 with relation to the journals 5 is such, as seen clearly in Fig. 2, that when filled with oil the level thereof lies above and submerges the bottoms of the journal bearings, and the bottom of the reservoirs is sufficiently low to provide ample capacity for oil, thereby avoiding the necessity for frequent refilling. The outside wall of the reservoirs is cut down on a slant from the face of the side irons, as shown in Fig. 2, to avoid overfilling. The oil is prevented from draining outwardly from the bearings by the outer wall of the reservoirs, and is prevented from draining inwardly therefrom by an embossment or flange 9 rising from the inner face of the side irons, both the outer walls of the reservoirs and the inner flanges of the side irons, rising above the bottom of the bearings—Fig. 2. The inner face of the flanges 9 is tapered, as shown in Fig. 2, to avoid the tendency of a thrust strain against them. Oil grooves 10, Fig. 3, are cut in the Babbitt bushings 4 to distribute the oil uniformly, and a pipe thread 11 is tapped in at the bottom of each reservoir for drainage—Fig. 2. In the saddle 6, a groove 12 is provided partly around each of its journals 5. These grooves 12 fit over the flanges 9 of the side irons with sufficient clearance to avoid contact with their surfaces, thus making it possible for the journals to rest on the bearings, while preventing the oil from draining out. The stock indicated at 13, in Figs. 3 and 4, on the saddle is provided to strengthen the journals, at the same time giving room for ample oscillation of the walking-beam, and also, by contact with the ends of the flanges, to act as a rest for the beam when the driving crank or pitman is disconnected from said beam during repairs.

I claim:—

A walking-beam bearing comprising a pair of side irons with journal bearings in their heads, and adapted to be fitted to a supporting post, each of said irons having on its outer side an oil reservoir to supply said bearings, and having also on its inner side an uprising flange lying in the lower portion of the bearing and having a length less than the circumference of said bearing; and a saddle member adapted to be fitted to a walking beam, said member having journals mounted for oscillation in the bearings of the side irons, the journals having grooves fitting over the flanges of the irons, said grooves partially encircling the journals and leaving an upper portion thereof giving room for beam oscillation and adapted by contact with the ends of the flanges to serve as a rest for the beam.

In testimony whereof I have signed my name to this specification.

ALONZO LEWIS HALLIDAY.